US008457105B2

(12) United States Patent
Boucadair et al.

(10) Patent No.: US 8,457,105 B2
(45) Date of Patent: *Jun. 4, 2013

(54) METHOD OF PROPAGATING IP CONNECTIVITY INFORMATION BETWEEN DISTINCT IP TELEPHONY DOMAINS, AND A CORRESPONDING LOCATION SERVER AND COMPUTER PROGRAM

(75) Inventors: Mohamed Boucadair, Caen (FR); Pierrick Morand, Bretteville sur Odon (FR)

(73) Assignee: France Telecom, Paris (FR)

( * ) Notice: Subject to any disclaimer, the term of this patent is extended or adjusted under 35 U.S.C. 154(b) by 516 days.

This patent is subject to a terminal disclaimer.

(21) Appl. No.: 12/297,985

(22) PCT Filed: Apr. 20, 2007

(86) PCT No.: PCT/FR2007/051147
§ 371 (c)(1),
(2), (4) Date: Oct. 21, 2008

(87) PCT Pub. No.: WO2007/122352
PCT Pub. Date: Nov. 1, 2007

(65) Prior Publication Data
US 2009/0175267 A1    Jul. 9, 2009

(30) Foreign Application Priority Data

Apr. 21, 2006 (FR) ..................... 06 03624

(51) Int. Cl.
*H04L 12/28* (2006.01)
*H04L 12/66* (2006.01)
*G06F 15/173* (2006.01)

(52) U.S. Cl.
USPC ............ 370/351; 370/352; 709/238; 709/242

(58) Field of Classification Search
CPC .......... H04L 12/28; H04L 12/66; G06F 15/173
USPC .................. 370/352, 389, 351; 709/238, 242
See application file for complete search history.

(56) References Cited

U.S. PATENT DOCUMENTS

| 6,584,093 B1 | 6/2003 | Salama et al. |
| 6,741,585 B1 | 5/2004 | Munoz et al. |
| 7,565,448 B1 | 7/2009 | Schlesener et al. ........... 709/242 |
| 2002/0145975 A1 | 10/2002 | MeLampy et al. |

(Continued)

OTHER PUBLICATIONS

Rosenberg, J. et al: "Usage of TRIP in Gateways for Exporting Phone Routes". IETF Standard-Working-Draft, Internet Engineering Task Force, IETF, CH, No. 3, Nov. 2001.

(Continued)

*Primary Examiner* — Phirin Sam
*Assistant Examiner* — Tarell Hampton
(74) *Attorney, Agent, or Firm* — David D. Brush; Westman, Champlin & Kelly, P.A.

(57) ABSTRACT

A method is provided for propagating at least one route for at least one digital stream between a first location server of a first IP telephony domain and a second location server of a second IP telephony domain, the first location server belonging to an autonomous system, and the route for transferring the at least one digital stream. The method includes a stage of propagating at least one identification relating to the autonomous system of the first location server towards the second server.

6 Claims, 4 Drawing Sheets

U.S. PATENT DOCUMENTS

| | | |
|---|---|---|
| 2005/0188106 A1* | 8/2005 | Pirbhai et al. .................. 709/238 |
| 2006/0098577 A1* | 5/2006 | MeLampy et al. ............ 370/238 |
| 2006/0200579 A1 | 9/2006 | Vasseur et al. |
| 2006/0262776 A1* | 11/2006 | Pollock ......................... 370/352 |
| 2009/0080414 A1 | 3/2009 | Boucadair et al. |
| 2009/0175266 A1 | 7/2009 | Boucadair et al. |
| 2009/0175267 A1 | 7/2009 | Boucadair et al. |
| 2010/0091976 A1 | 4/2010 | Boucadair |

OTHER PUBLICATIONS

Rosenberg, J. et al: "A Framework for Telephony Routing Over IP". IETF Standard, Internet Engineering Task Force, IETF, CH, Jun. 2000.

International Search Report and Written Opinion of Counterpart Application No. PCT/FR2007/0511547 Filed on Apr. 20, 2007.

International Search Report dated Aug. 31, 2007 for corresponding International Application No. PCT/FR2007/051149, filed Apr. 20, 2007.

Schlesener, M.C. et al., "Performance Evaluation of Telephony Routing Over IP (TRIP)", IP Operations & Management, 2003. (IPOM 2003). 3rd IEEE Workshop on Oct. 1-3, 2003, Piscataway, NJ, USA, ISSS, Oct. 1, 2003, pp. 47-53.

Rosenberg et al., "Telephony Routing Over IP (TRIP)", IETF Standard, Internet Engineering Task Force, IETF, CH, Jan. 2002.

International Search Report and Written Opinion of Counterpart Application No. PCT/FR2007/051147, filed Apr. 20, 2007.

Office Action dated Sep. 29, 2010 for U.S. Appl. No. 12/298,000.

English Translation of Written Opinion, dated Oct. 3, 2007 for corresponding International Application No. PCT/FR200/051147, filed Apr. 20, 2007.

Notice of Allowance dated Mar. 21, 2011 for U.S. Appl. No. 12/298,000, filed Oct. 21, 2008.

* cited by examiner

METHOD OF PROPAGATING IP CONNECTIVITY INFORMATION BETWEEN DISTINCT IP TELEPHONY DOMAINS, AND A CORRESPONDING LOCATION SERVER AND COMPUTER PROGRAM

CROSS-REFERENCE TO RELATED APPLICATIONS

This Application is a Section 371 National Stage Application of International Application No. PCT/FR2007/051147, filed Apr. 20, 2007 and published as WO 2007/122352 on Nov. 1, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telephony over networks of the Internet type (i.e. based on the Internet protocol (IP)). The term "telephony" is used herein to cover not only conventional telephony services but also services that are advanced such videophone services or transferring digital data.

More precisely, the present disclosure lies in the context of exchanging information relating to the datagram transport services used for routing information streams between the management entities of IP telephony domains.

In particular, the disclosure relates to transferring IP domain identifiers in the border gateway protocol (BGP) meaning in routing advertisements between IP telephony domains (ITADs).

The IP network is the backbone network adopted by operators for pooling the heterogeneous services they offer, including IP telephony, commonly referred to as voice over IP (VoIP), or more generally grouped under the heading of conversational services.

The deployment of these real time voice or video applications towards an all-IP network, and also the migration of the public switched telephone network (PSTN) thereto are constraining operators to provide global coverage for these services on a worldwide scale. This means that it is not sufficient to provide points of presence all over the globe, but that clients must be given the option of calling any destination (specifically clients of other operators). This global coverage can be achieved by establishing interconnection agreements with other third-party service providers in order to extend the scope of a service outside the administrative borders of a single service provider.

On these lines, it is expected that co-operation between providers of VoIP/ToIP (telephony over IP) services will intensify in the short and medium term. This intensification should enable traffic associated with voice to be delivered to termination points that lie outside the IP telephony administration domains (ITADs) of operators. Such co-operation between providers is of strategic important since conventional bilateral type agreements do not make it possible to obtain the global coverage that operators require.

In addition, offers of telephony deployed over an IP network need to satisfy quality constraints such as high availability and good tolerance to faults. The service availability constraint applies not only to the service layer, but also to the transport layer.

Below in this document, the terms "quality of service" and "QoS" are used interchangeably to designate the same concept. Reference is also made to the following terms:

LS (location server): this is an entity of a telephone domain (ITAD) that manages the client locations and routes of a local ITAD. This equipment can interface with a neighboring LS in order to discover the locations of clients managed by other ITADs;

AS (autonomous system): this is a set of IP resources managed by a single administrative entity, also referred to as an IP connectivity provider. In the context of the border gateway protocol (BGP, RFC1771) for routing between domains, each AS is identified by a unique identifier. Such An AS is also referred to as an IP transfer domain in so far as it refers to the network and transport layers of the OSI model.

BACKGROUND OF THE DISCLOSURE

1. Prior Art

In "conventional" telephony mode (using the public switched telephone network (PSTN)), telephony operators establish bilateral agreements to extend the global coverage of the telephone service. The level of coverage achieved depends essentially on the number of agreements made. In outline, it can be considered that two categories of telecommunications operator are in existence: local and/or national operators, and global operators. The major global operators make a large number of agreements and can thus reach most existing destinations. Local operators make only a small number of agreements, including only one or two with major operators. Thus, a incumbent national operator in a developing country will make agreements with other national operators and one or two agreements with global operators in order to deliver calls to the rest of the world.

At present, most operators are migrating their PSTN networks to solutions and infrastructures that are based on the IP protocol. To accompany the deployment of VoIP services, the Internet engineering task force (IETF) has undertaken a large amount of standardization work. Several protocols have been specified, amongst which mention can be made of session initiation protocol (SIP), session description protocol (SDP), real-time transfer protocol (RTP), real-time transfer control protocol (RTCP), multimedia gateway control protocol (MGCP), session announcement protocol (SAP), and telephony routing over IP (TRIP, RFC3219). These protocols satisfy different requirements and in particular they incorporate call signaling and control, the exchange and control of media streams, and the exchange of call routing information.

TRIP enables interconnected ITADs to exchange all of the destinations they can reach, thereby serving in particular to facilitate the selection of the gateways that are the most appropriate for delivering IP telephony traffic to the PSTN. The TRIP protocol is implemented by location servers (LS) that propagate TRIP routes containing attributes that serve to describe the routes in question. The use of this particular protocol is independent of the type of signaling protocol deployed for actually setting up calls. The TRIP protocol can be used together with SIP, H.323, or any other signaling protocol. Each LS maintains a local routing database known as the telephony routing information database (TRIB). This routing database is fed with advertisements received from neighboring LSes (from another telephony domain, for example). The operation of the TRIP protocol is similar to that of the BGP protocol. Advertisements between neighboring LSes are made in the form of route update messages, referred to simply as update messages. These messages are defined by the TRIP protocol and they are exchanged between LSes in order to inform a neighboring domain about routes that are available.

Activation of the TRIP protocol between various ITADs is described with reference to FIG. 1 (for reasons of simplicity, the term "domain" is also used to denote an ITAD), each ITAD being administered by a single IP telephony operator. Each of these operators has one or more LSes. Each LS maintains a routing database that it feeds with advertisements received from its neighbors (i.e. in other domains) and from LSes in its own domain. These advertisements are updated and forwarded to other neighbors when interconnection agreements permit this.

Thus, the LS of ITAD4 14, for example, updates the advertisements received from the LS of ITAD5 15 and reprogates them to ITAD3 13. It should be observed that an ITAD is not necessarily deployed on a single AS or "IP transfer domain".

From the routing point of view, an LS handles three types of route:
- external routes, received from LSes situated in neighboring ITADs;
- internal routes, received from LSes situated in the same ITAD; and
- local routes, configured locally in each LS for injection into TRIP processes.

This operation is performed either by static configuration or by redistributing information coming from other routing protocols.

These routes are managed in the routing tables of the telephony routing information base (TRIB). Thus, four types of TRIB are managed by an LS, as is shown in FIG. 2. These tables exist in a single LS, and the relationship between the tables are described with reference to FIG. 2.
- "Adj-TRIBs-In" 22: stores routing information conveyed by update messages. This routing information, also referred to as "routes", constitutes the input to a route selection process 21 (decision process). A given LS maintains an adjacent TRIB-In table 22 for each neighboring LS in which it stores all of the route advertisements received from an adjacent LS;
- "Ext-TRIB" 24: only one external TRIB table is maintained by an LS. This table contains the results of a route selection process applied to external routes 25 (Adj-TRIBs-IN) and local routes 26. Prior art techniques enable only one route to be selected per destination;
- "Loc-TRIB" 20 ("local TRIB"): this table contains the local routes that result from applying routing policies that are local to each LS; and
- "Adj-TRIBs-Out" 23 (adjacent TRIBs out): these are the routes that the local LS will advertise to its peers.

At IP level, it is possible to use the QoS-enhanced border gateway protocol (q-BGP) in order to be aware of the QoS treatment to which the voice streams will be subjected by the network/transport levels.

2. Drawbacks of the Prior Art

Nevertheless, the inventors have found that, at this stage in the development of the TRIP protocol, no account is taken of correlation with the data transport layer, in particular using the BGP and q-BGP protocols or any other IP routing protocol.

In other words, the service layer, managed by the TRIP protocol, for example, has no information about the state of data transfer at transport layer level, and no information about the ASes that have been passed through in order to place an IP telephony call.

More generally, the present specifications describing the protocols that are implemented for IP data transfer do not correlate the service layer and the network/transport layers.

Thus, at present, an LS has no way of selecting a data transfer path as a function of the IP connectivity operator in charge of routing traffic. The TRIP protocol can maintain the path of ITADs that have been passed through (service layer), but not the path of the ASes that have been passed through (network/transport layers).

In other words, a telephony service operator or provider has no means at present for knowing which ASes voice data transit through, and therefore cannot tell whether they are transmitting through ASes of a competitor, and this applies even when the "service" level path is determined.

Specifically, these drawbacks are illustrated with reference to FIG. 3 showing the dependencies of an IP network both "vertically", i.e. between ITADs and ASes depending therefrom, and "horizontally", i.e. between (service) domains and connectivity operators (IP level).

It is assumed that a client S 301 is communicating with a destination client D 302. To do this, the ITAD1 311 from which the client S 301 depends selects the telephone level route passing through ITAD2 312, ITAD3 313, and finally ITAD6 316 from which the destination D 302 depends, in order to cause voice data to be transferred.

Nevertheless, the data itself transits in the IP layer via ASes, from each of which a plurality of ITADs depends. An AS loop or spiral occurs when, at the end of negotiation between ITADs for routing a media stream, this stream passes more than once through a single AS prior to reaching its destination.

In the example shown in FIG. 3, this telephone level route assumes that an IP route exists passing through the domains AS1 321, AS2 322, AS1 321, and finally AS6 326. A spiral is said to exist at IP level. The existence of a spiral can be harmful to the performance of IP datagram transfer since the datagrams pass more than once through AS1.

SUMMARY

An aspect of the disclosure relates to a method of propagating at least one route for at least one digital stream between a first location server suitable for managing the locations of clients of a first IP telephony domain and a second location server suitable for managing the locations of clients of a second IP telephony domain, said first location server belonging to an autonomous system, the route being for transferring said at least one digital stream.

According to an embodiment of the invention, such a method comprises a stage of propagating at least one identification relating to said autonomous system of said first location server towards said second server.

Thus, an embodiment of the invention relies on an entirely novel approach for propagating routes, enabling a location server to obtain the identity of the autonomous system in charge of actually transferring data. In the prior art, location servers propagate telephony routes that cannot be associated with actual data transport routes. The method of an embodiment of the invention makes it possible to identify the autonomous systems passed through during transport at telephony route level. The telephony domain entity may be any system in charge of transferring and/or advertising and/or exchanging telephony routes in telephony domains.

According to a particular aspect of the invention, said propagation stage comprises the following steps:
  identifying said autonomous system;
  composing a propagation message including said identification relating to said autonomous system and destined for said second location server; and
  sending said propagation message to said second location server.

Thus, a route is propagated in three steps. The step whereby the entity of the first IP telephony domain identifies the autonomous system (AS) enables the identity of the autonomous system to be recovered. This identity is then inserted in a route propagation message advertising or updating a telephony route to a given destination and sent towards the second location server. This second location server is thus informed about the autonomous system of the first location server (or of the list of autonomous systems for reaching said destination).

In a particular implementation, said composition step comprises the following steps:
  obtaining a propagation information list within said first location server;
  modifying said propagation information list as obtained by adding the identification relating to said autonomous system if said second IP telephony domain of said second location server is different from said first IP telephony domain of said first location server; and
  inserting said modified propagation information list in said propagation message.

Thus, the composition of the propagation message for said second telephone domain location server begins by obtaining a propagation information list. This list already present within said first location server is updated if the second location server is different from the first and if a route is already present in the LS, otherwise the list is initialized with the value of the local autonomous system. This updating consists in adding the identifier of the autonomous system of the first location server to the propagation list. The propagation list thus makes it possible to broadcast the identification data of the ASes passed through in order to reach the destination, for the attention of telephone domain entities (local or neighboring).

According to an original characteristic, said propagation information list comprises a sequence of propagation information segments and one of said propagation information segments contains attributes belonging to the group comprising at least:
  information representative of an ordering of autonomous systems;
  information representative of a number of autonomous systems; and
  at least one identification of an autonomous system.

The propagation list thus contains data segments. These segments contain information relating to autonomous systems. The information that can be contained in such a segment serves to find out the ordering of autonomous systems, the number of systems in the segments, and the identities of the autonomous systems. Thus, the entity of the telephone domain that receives said list is in a position to construct a routing database identifying the autonomous systems to be passed through in order to reach a given destination.

In a particular aspect of the invention, said step of obtaining said propagation information list comprises:
  a step of copying said propagation information list if said propagation information list exists; and
  a step of creating a new propagation information list if said propagation information list does not exist.

With the help of these steps, the telephony domain entity can always supply a propagation information list to another telephony domain entity should that other entity request it.

An embodiment of the invention also provides a location server suitable for managing the locations of clients of a first IP telephony domain and suitable for propagating at least one route for at least one digital stream towards a second location server suitable for managing the locations of clients of a second IP telephony domain, said first location server belonging to an autonomous system, and said route serving to transfer said at least one digital stream.

According to an embodiment of the invention, such a location server comprises means for propagating at least one identification relating to said autonomous system towards said second location server.

Thus, the location server of an embodiment of the invention is in a position to provide information identifying the autonomous systems to be passed through while digital streams are actually being transferred.

More generally, such a location server has means for implementing the steps of the route propagation method of an embodiment of the invention.

In another embodiment, the invention also provides a computer program product downloadable from a communications network and/or stored on a computer-readable medium and/or executable by a microprocessor.

According to an embodiment of the invention, in at least one embodiment, such a computer product program comprises program code instructions for executing the propagation method as described above.

BRIEF DESCRIPTION OF THE DRAWINGS

Other characteristics and advantages appear more clearly on reading the following description of a preferred embodiment given merely by way of non-limiting illustrative example, and from the accompanying drawings, in which.

DETAILED DESCRIPTION OF ILLUSTRATIVE EMBODIMENTS

Figure 1:
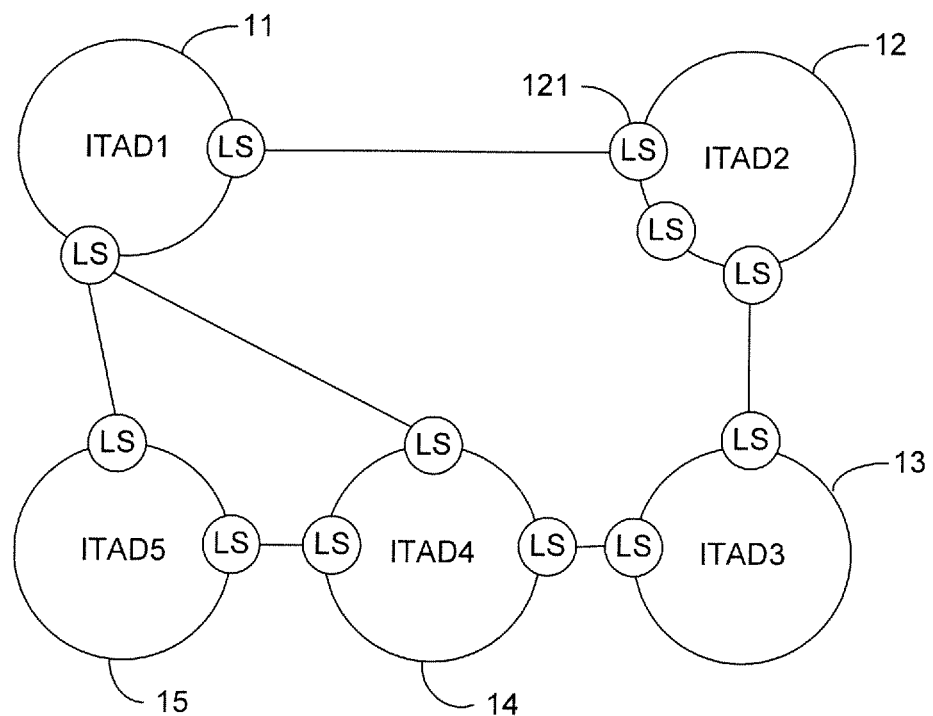
FIG. 1, described with reference to the prior art, shows an example of architecture for a network managed by the TRIP protocol.
Figure 2:
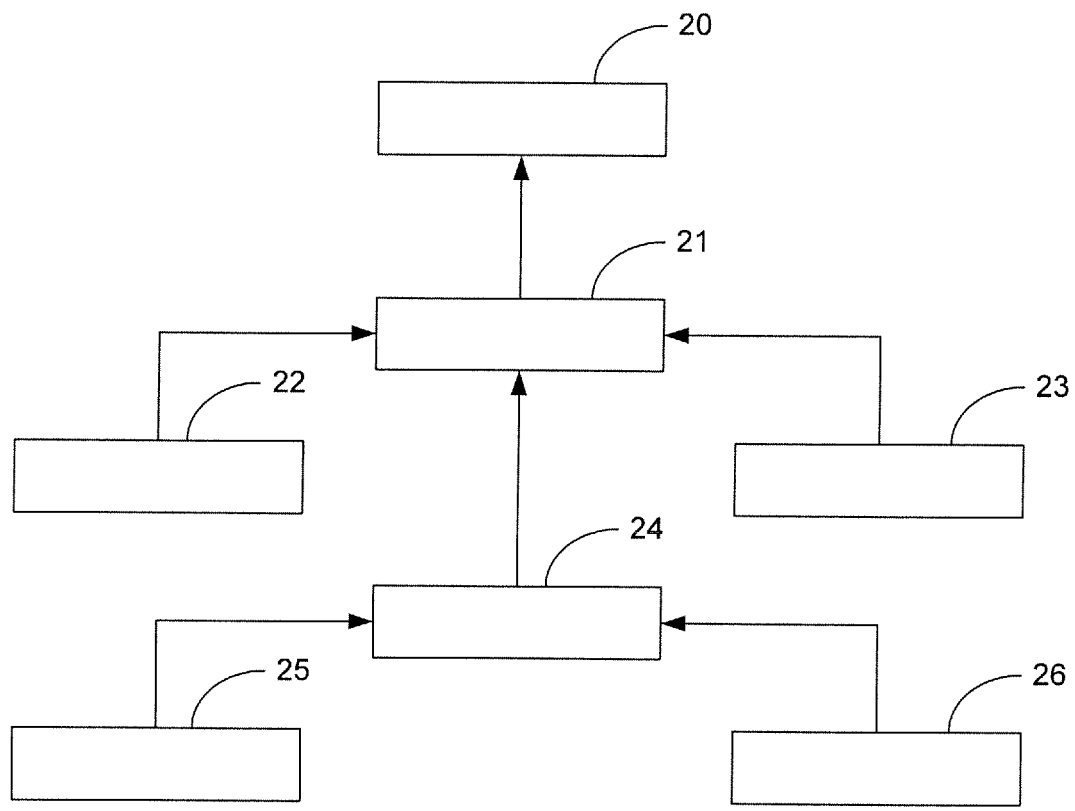
FIG. 2 shows the structure of the routing databases (TRIBs) used by the location servers (LSs) routing calls in the telephony domains (ITADs) shown in FIG. 1.
Figure 3:
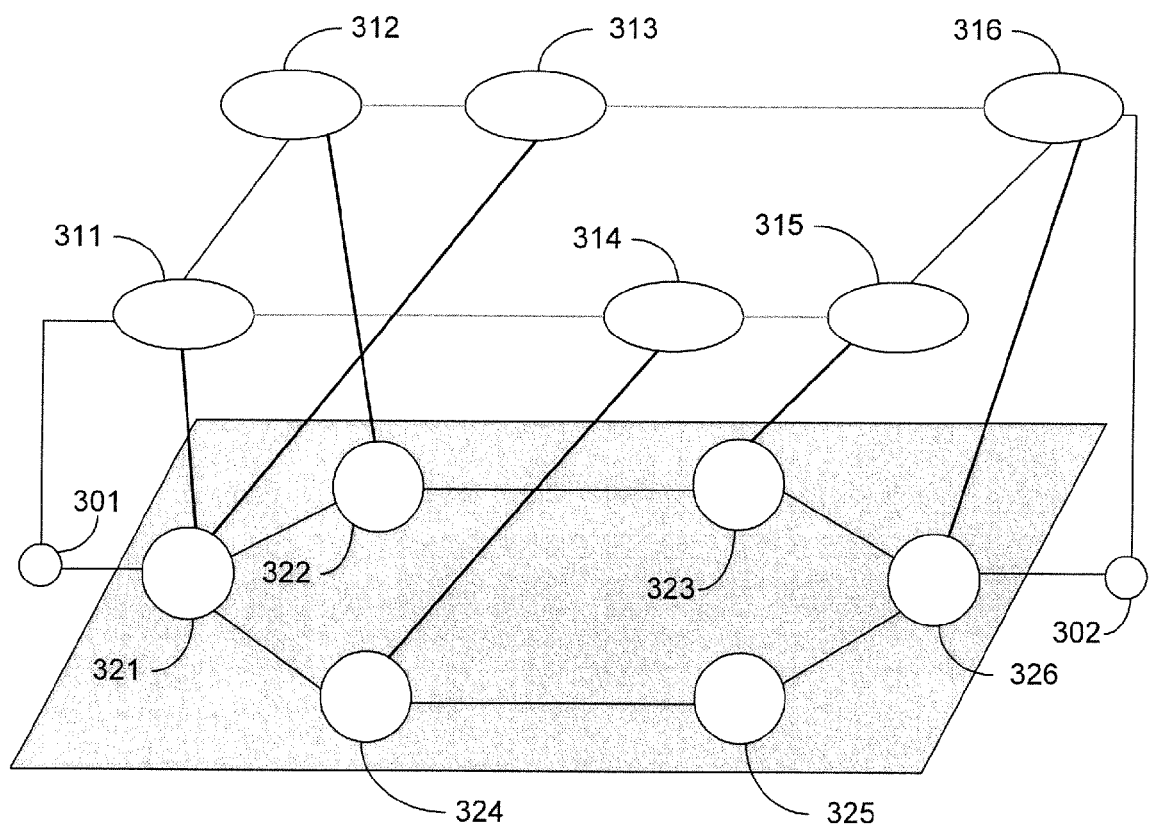
FIG. 3, mentioned above, shows one of the drawbacks of the state of the art, such as spirals.

For greater clarity, there follows a description of an implementation of an embodiment of the invention using the TRIP protocol in the service layer. Nevertheless, it is clear that the invention is not limited to this particular protocol, but can also be applied to any new protocol for exchanging routes between IP telephony operators.

1. Recap of the Principle of an Embodiment of the Invention

An embodiment of the invention thus proposes improving the operation of the TRIP protocol and thereby making new functions possible.

To do this, the general principle of an embodiment of the invention rests in particular on introducing a novel attribute, containing information about the providers of IP connectivity service used for routing voice traffic. More clearly, an embodiment of the invention enables the service layer to identify the ASes or IP connectivity operators used for routing voice traffic.

Knowledge of such information in an LS and propagation thereof then makes numerous applications and optimizations possible in the management of inter-domain telephony service. For example, in a particular implementation, this information can be used for improving the quality of service of inter-domain telephone calls. Furthermore, still on the basis of this information, an LS has means that are simple and effective for optimizing an end-to-end path for a given destination. The same information also makes it possible to detect anomalies, such as IP spirals, for example, since the service layer knows which ASes the data transit through in order to reach the final destination for a given call.

The present application describes only the principle whereby information or identifiers relating to the transport layer is raised to a higher layer. A list of identifiers relating to the transport layer is obtained, and it is subsequently propagated between the LSes implemented by the ITADs.

More precisely, a novel attribute is described containing one or more AS numbers (identifiers). This makes it possible to identify the ASes through which voice is routed towards a given destination. This number/identifier is delivered to an administrative management domain (ITAD) that forwards it to a neighboring domain.

This document describes an implementation based on location servers LS. Naturally, this implementation is merely an example. In particular, an embodiment of the invention can perfectly well be implemented using proxy servers (PS) or any other functional element defined by a future protocol and incorporating the functions defined for an LS in the context of this embodiment of the invention.

2. Format

Conventionally, it is recalled that the TRIP protocol is implemented by location servers (LSes) that propagate TRIP routes, containing attributes that enable the routes exchanged to be described.

More precisely, the standard version of the TRIP protocol (described in detail in document RFC3219 by Rosenberg et al.: "Telephony routing over IP (TRIP)", January 2002) provides for routing information to be exchanged between two neighboring LSes (which LSes may belong to the same ITAD or to neighboring ITADs) via the update message, which comprises a certain number of attributes.

In order to know the suppliers of IP connectivity service used for routing voice traffic of an ITAD to a given destination, a new attribute is introduced named AS_PATH. This attribute is defined as follows:
conditional mandatory: true
TRIP type code: to be defined by IANA
conditional mandatory: this parameter indicates whether or not the attribute in question needs to be provided in a TRIP message
TRIP type code: this parameter specifies a unique identifier of the TRIP message in question.

The purpose of this attribute is to create and store a list of the ASes passed through in order to reach the destination in question. In other words, it is an attribute of the service layer that contains information relating to the IP layer. It is then propagated from one IP telephony domain (ITAD) to a neighboring IP telephony domain, and so on.

The AS_PATH attribute is made up of a sequence of "AS path" segments, or fields. Each "AS path" segment is made up of a triplet <path segment type, path segment lengths, path segment value>, defined as follows:

Each "path segment type" has a length of one octet and can take the following values:

| Value | Segment type |
|---|---|
| 1 | AS_SET: a non-ordered series of the ASes pass through by a route contained in a TRIP update message |
| 2. | AS_SEQUENCE: an ordered sequence of the ASes pass through by a route contained in a TRIP update message |

Each "path segment length" has a length of one octet and contains the number of ASes contained in the "path segment value".

The "path segment value" field contains one or more AS numbers, each encoded as a field having a length of two octets.

This new attribute thus lists the succession of ASes through which the data associated with a call passes.

3. Procedure

Figure 4:
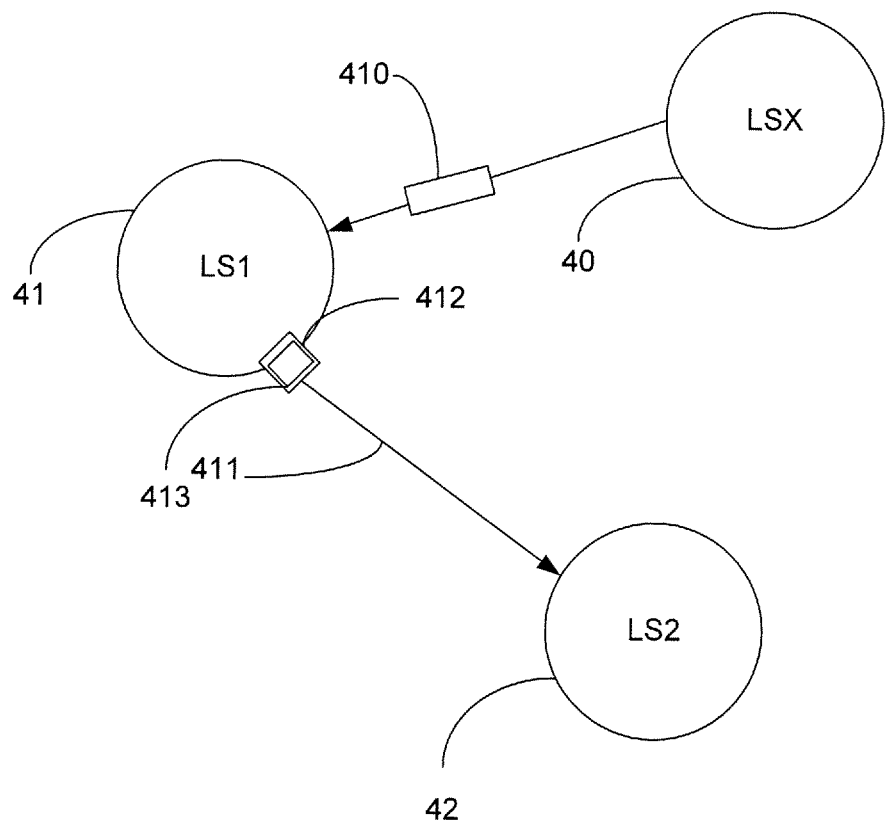
FIG. 4 describes route propagation between two location servers.

It is recalled that each telephony operator has one or more LSes. Each LS maintains a routing table that it builds up from advertisements received from the LSes of neighboring domains or from LSes within in its own domain. These advertisements are updated and redistributed to other neighbors where so permitted by interconnection agreements. The procedure is described with reference to FIG. 4.

In an embodiment of the invention, when an LS 41 propagates (411) a TRIP route 412 that it has learned in an update message 410 from some other, neighboring LS 40, provision is made for it to modify the new AS_PATH attribute 413 of the route depending on the type of LS 42 to which it is to repropagate that route, using the following procedure.

When a given LS advertises the route to another TRIP peer LS situated in its own ITAD, the LS does not modify the AS_PATH attribute associated with the route.

If the LS to which the route is advertised (peer LS) is not situated in the same ITAD, two circumstances can arise for updating the AS_PATH attribute:
if the first segment of the AS_PATH is of the AS_SEQUENCE type, the local system adds the number of its own IP connectivity service provider (i.e. the AS identifier) as the last element in the sequence;
if the first segment of the AS_PATH is of the AS_SET type, then the local system adds a new segment of the AS_SEQUENCE type at the beginning of the AS_PATH; this new segment contains the domain number of its IP connectivity service provider.

If the LS originates the advertisement, then the advertisement includes the number of its own IP connectivity service provider in the AS_PATH attribute of all of the update messages to be sent to its TRIP peers situated in neighboring ITADs. Furthermore, the LS includes an empty AS_PATH in all the update messages that are to be sent to its TRIP peers situated in its own ITAD.

4. Use

This attribute can be used by the route selection process to eliminate routes containing spirals at IP level. Furthermore, this attribute can be used by an ITAD by guiding the process of updating quality of service information contained in TRIP routes. This attribute can also be used for determining the IP treatment associated with a given call.

When an ITAD is attached to a plurality of ASes, it can advertise some of its prefixes while stating that these prefixes are managed (at IP level) by a provider X, and others of its prefixes while indicating that these prefixes are managed by a provider Y.

A new prefix telephony management attribute is described below. It is clear that these examples of applications are given purely by way of non-exhaustive or non-limiting illustration.

5. Telephony Numbers for Extending Numbers of the E164 Type

The TRIP protocol is capable of exchanging only E.164 type numbers or decimal type numbers. This presents an obstacle for new actors having domain names only and seeking to activate the TRIP protocol in order to interconnect with other operators.

Two new numbers of the alphanumeric type are introduced below. Such numbers enable calls to be routed to numbers other than those defined by E.164. By means of this extension, "VoIP" service platforms such as those that do not use traditional telephone numbers can interconnect with other operators so as to offer a global voice service.

In order to enable routing information to be exchanged other than E.164 type numbers or numbers defined in RFC3219, another type of number is defined as follows:
  code: address family
  4: alphanumeric routing numbers.

Thus, the "address family" field of a TRIP route can take the value 4 to designate an alphanumeric type number. This number is defined by a conventional Backus-Naur form (BNF) grammar and takes the following format:

| | |
|---|---|
| alphanumeric-routing-number = | *alphanumeric |
| alphanumeric = | alpha \| DIGIT \| mark \| separators |
| alpha = | lowalpha \| upalpha |
| upalpha = | "A" \| "B" \| "C" \| "D" \| "E" \| "F" \| "G" \| "H" \| "I" \| "J" \| "K" \| "L" \| "M" \| "N" \| "O" \| "P" \| "Q" \| "R" \| "S" \| "T" \| "U" \| "V" \| "W" \| "X" \| "Y" \| "Z" |
| lowalpha = | "a" \| "b" \| "c" \| "d" \| "e" \| "f" \| "g" \| "h" \| "i" \| "j" \| "k" \| "l" \| "m" \| "n" \| "o" \| "p" \| "q" \| "r" \| "s" \| "t" \| "u" \| "v" \| "w" \| "x" \| "y" \| "z" |
| DIGIT = | "0" \| "1" \| "2" \| "3" \| "4" \| "5" \| "6" \| "7" \| "8" \| "9" |
| mark = | "-" \| "_" \| "." \| "!" \| "~" \| "*" \| "'" \| "(" \| ")" |
| separators = | "(" \| ")" \| "<" \| ">" \| "@" \| "," \| ";" \| ":" \| "\" \| "/" \| "[" \| "]" \| "?" \| "=" \| "{" \| "}" |

The new numbers proposed for propagating with the help of the TRIP protocol can therefore have the following format:
1. med@francetelecom
2. uri:med@192.165.56.3:5632
3. med.francetelecom.com:4578
4. userid=med, host=125.12.25.265, port=2178

The format of these numbers is negotiated when drawing up an interconnection agreement between two neighboring ITADs.

Although the present disclosure has been described with reference to one or more examples, workers skilled in the art will recognize that changes may be made in form and detail without departing from the scope of the disclosure and/or the appended claims.

The invention claimed is:

1. A method comprising:
  propagating at least one route for at least one digital stream between a first location server suitable for managing the locations of clients of a first IP telephony domain and a second location server suitable for managing the locations of clients, said first location server belonging to a first of a plurality of autonomous systems, each autonomous system managing a set of IP resources by a single administrative entity, the route being for transferring said at least one digital stream, wherein the propagating comprises:
    receiving a first route update message, said first route update message comprising:
      a list of identifiers of the autonomous systems through which the route update message has passed; and
      a list of IP telephony domains through which the first route update message has passed;
    if the second location server is situated in the first IP telephony domain, propagating the first route update message to the second location server without modifying the list of identifiers of the autonomous systems through which the first route update message has passed; and
    if the second location server is situated in a second, different IP telephony domain, adding an identifier of the first autonomous system to the list of identifiers of the autonomous systems through which the first route update message has passed; and
    propagating the first route update message to the second location server.

2. The method according to claim 1, wherein propagating further comprises:
  composing with the first location server a second route update message for at least one neighboring location server;
  when the at least one neighboring location server is located outside the first IP telephone domain, including a second list of identifiers of the autonomous systems in the second route update message and adding the identifier of the first autonomous system to the second list;
  when the at least one neighboring location server is located inside the first IP telephone domain, including an empty second list of identifiers of the autonomous systems in the second route update message; and
  propagating the second route update message from the first location server to the at least one neighboring location server.

3. The method according to claim 1, wherein said list of identifiers of the autonomous systems comprises a sequence of propagation information segments;
  and wherein one of said propagation information segments contains attributes comprising at least:
    information representative of an ordering of the autonomous systems through which the first route update message has passed;
    information representative of a number of autonomous system identifiers contained within the list; and
    at least one identifier of an autonomous system.

4. The method according to claim 2, wherein said step of obtaining said propagation information list composing comprises:
  a step of copying said second list of identifiers if said second list of identifiers exists in said first location server; and
  a step of creating a new second list of identifiers if said second list of identifiers does not exist in said first location server.

5. A first location server suitable for managing the locations of clients of a first IP telephony domain and suitable for propagating at least one route for at least one digital stream towards a second location server suitable for managing the locations of clients of a second IP telephony domain, said first location server belonging to first of a plurality of autonomous systems, each autonomous system managing a set of IP resources by a single administrative entity, and said route serving to transfer said at least one digital stream, and wherein the first location server comprises:
- means for receiving a first route update message, said first route update message comprising:
  - a list of identifiers of the autonomous systems through which the route update message has passed; and
  - a list of IP telephony domains through which the first route update message has passed;
- means for propagating the first route update message to the second location server without modifying the list of identifiers of the autonomous systems through which the first route update message has passed, if the second location server is situated in the first IP telephony domain;
- means for adding an identifier of the first autonomous system to the list of identifiers of the autonomous systems through which the first route update message has passed, if the second location server is situated in a second, different IP telephony domain; and
- means for propagating the first updated the route update message to the second location server.

6. A computer program product stored on a non-transitory computer-readable medium and comprising program code instructions for executing a method of propagating at least one route for at least one digital stream between a first location server suitable for managing the locations of clients of a first IP telephony domain and a second location server suitable for managing the locations of clients of a second IP telephony domain, when executed on a computer, said first location server belonging to a first of a plurality of autonomous systems, each autonomous system managing a set of IP resources by a single administrative entity, the route being for transferring said at least one digital stream, wherein the method comprises:
- receiving a first route update message, said first route update message comprising:
  - a list of identifiers of the autonomous systems through which the route update message has passed; and
  - a list of IP telephony domains through which the first route update message has passed;
- if the second location server is situated in the first IP telephony domain, propagating the first route update message to the second location server without modifying the list of identifiers of the autonomous systems through which the first route update message has passed;
- if the second location server is situated in a second, different IP telephony domain, adding an identifier of the first autonomous system to the list of identifiers of the autonomous systems through which the first route update message has passed; and
- propagating the first route update message to the second location server.

* * * * *

UNITED STATES PATENT AND TRADEMARK OFFICE
CERTIFICATE OF CORRECTION

PATENT NO.        : 8,457,105 B2
APPLICATION NO.   : 12/297985
DATED             : June 4, 2013
INVENTOR(S)       : Boucadair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this
Eighth Day of September, 2015

Michelle K. Lee
*Director of the United States Patent and Trademark Office*